United States Patent
Frater

[19]

[11] Patent Number: 5,815,349
[45] Date of Patent: Sep. 29, 1998

[54] SUSPENSION WITH WIRE PROTECTION WHICH DOES NOT IMPACT SLIDER MOVEMENTS

[75] Inventor: Norman Kermit Frater, San Jose, Calif.

[73] Assignee: International Business Machines Corporation, Armonk, N.Y.

[21] Appl. No.: 798,811

[22] Filed: Feb. 12, 1997

Related U.S. Application Data

[63] Continuation of Ser. No. 531,959, Sep. 21, 1995.

[51] Int. Cl.$^6$ ........................................................ G11B 5/48
[52] U.S. Cl. .................................................... 360/104
[58] Field of Search ................................... 360/103, 104, 360/105, 106, 107, 108

[56] References Cited

U.S. PATENT DOCUMENTS

| | | | |
|---|---|---|---|
| 4,734,805 | 3/1988 | Yamada et al. | 360/104 |
| 5,027,239 | 6/1991 | Hagen | 360/104 |
| 5,282,103 | 1/1994 | Hatch et al. | 360/104 |
| 5,311,384 | 5/1994 | Johnson | 360/104 |
| 5,331,489 | 7/1994 | Johnson et al. | 360/104 |
| 5,333,085 | 7/1994 | Prentice et al. | 360/104 |
| 5,353,181 | 10/1994 | Frater et al. | 360/104 |

FOREIGN PATENT DOCUMENTS

| | | | |
|---|---|---|---|
| 60-167173 | 8/1985 | Japan | 360/104 |
| 3059808 | 3/1991 | Japan | 360/104 |
| 6028802 | 2/1994 | Japan | 360/104 |

*Primary Examiner*—John H. Wolff
*Assistant Examiner*—David D. Davis
*Attorney, Agent, or Firm*—Gray Cary Ware Freidenrich

[57] ABSTRACT

A suspension is provided with a load beam which has a forward end portion which has a curved edge. Low profile wires from a slider of a head gimbal assembly (HGA) of the suspension extend across a top surface of the load beam in contact or in close proximity to the curved edge. When the slider pitches and rolls over the surface of a rotating magnetic disk, when the head element is accessed to read and write information from tracks on the disk, and when there are air flow forces, the wires move across the curved edge without any damage due to fretting. The forward end portion of the load beam is bent downwardly toward the HGA to provide the desired curved edge. When the slider pitches and rolls a flexure to which it is attached requires space for flexing, the space being located between the flexure and the load beam. In order to prevent intrusion into this space the forward end portion of the load beam is provided with a reduced thickness relative to the remainder of the load beam so that when the forward portion is bent downwardly to provide the curved edge it does not extend below a bottom surface of the load beam. The forward end portion can be provided with a reduced thickness by offset masking the top and bottom surfaces of thin metal stock followed by double etching. The double etching results in a thickness of the forward end portion which is substantially 50% the thickness of the remainder of the load beam. The forward end portion can then be bent to provide the curved edge by a die stamping process.

18 Claims, 8 Drawing Sheets

SUSPENSION WITH WIRE PROTECTION WHICH DOES NOT IMPACT SLIDER MOVEMENTS

This application is a continuation of Ser. No. 08/531,959 filed on Sep. 21, 1995.

BACKGROUND OF THE INVENTION

1. Field of the Invention

The present invention relates to a low profile wired head gimbal assembly which is mounted on a load beam of a magnetic disk drive wherein a forward edge of the load beam adjacent the head gimbal assembly is rounded to obviate fretting of wires adjacent the rounded edge when the wires move in response to movements of the head gimbal assembly.

2. Background of the Invention

A typical suspension for a magnetic disk drive includes a head gimbal assembly (HGA) which is mounted to a load beam. The load beam is an elongated thin metallic element having top and bottom surfaces bounded by forward and rear ends and a pair of sides. The HGA includes a flexure and a slider, the flexure being an elongated thin metallic element with top and bottom surfaces bounded by forward and rear ends and a pair of sides. The flexure has an opening with a tongue extending into the opening, the tongue being supported by a front base end portion and a pair of legs which are coextensive with the flexure's pair of sides. The slider is mounted to the bottom surface of the tongue and the flexure is mounted to the bottom surface of the load beam adjacent the load beam's forward end. The load beam is provided with a load dome which engages a top surface of the tongue to enable the tongue and the slider to move in pitch and roll with respect to the load beam about the load dome. The load beam and the HGA are configured with roll limiters which limit the degree of roll and pitch of the slider.

The slider carries a magnetic head for reading and writing on the magnetic disk of a disk drive. The rear end of the load beam is mounted to an actuator arm of an actuator so that the magnetic head can be positioned with respect to a magnetic disk. A spindle supports the magnetic disk and a motor is provided for rotating the spindle and disk. The load beam biases the slider and magnetic head into contact with the magnetic disk; in the art such biasing is known as "preloading". Processing circuitry is connected to: (1) the motor for rotating the disk; (2) the actuator for positioning the magnetic head; and (3) the magnetic head for processing write and read signals. When the magnetic disk is rotated the disk generates moving air (an "air bearing") which counterbalances the preloading and causes the slider and magnetic head to fly with respect to the surface of the disk. When a slider flies, a bottom surface (air bearing surface) of the slider supports the slider on the air bearing, spacing the slider from the surface of the disk. During flight of the slider, there are slight roll and pitch movements of the slider as allowed by the gimballing action of the HGA, the movements being caused by vertical runout of the disk and by dynamic forces.

The electrical connection between the magnetic head and the processing circuitry is made by wires which extend adjacent the top surface of the load beam. A particularly troublesome problem is proximity of the wires to a front edge of the load beam. The front edge of the load beam is currently made with a mask to form a desired shape. Masking is followed by etching to remove material beyond the mask. Etching results in a load beam front edge which has a sharp corner. Current specifications call for the wires to be as low as possible adjacent the front edge to provide a desired low wire profile so that stacking density of a multi-disk drive can be maximized. Consequently, there is high potential of the wires coming into contact with the sharp corner of the load beam and being fretted as the wires move in response to roll and pitch movements of the slider. Fretting of the wires can cause the wires to short to the load beam, while debris cast off the wires during the fretting can cause the slider's air bearing to crash.

One attempt to solve the above problem has been to bend a forward end portion of the load beam downwardly so that the wires are presented with a rounded front edge. This approach, however, presents another problem. The bending causes the forward end portion to bend below the bottom surface of the load beam in a critical area where the flexure needs space to make gimbal adjustments due to assembly tolerances and gimballing movements as the slider flies. It is important that up and down flexure movements of the legs and the tongue of the flexure be unrestrained as the slider rolls and pitches. The degree of freedom for flexure of these components should be within the limitations imposed by the roll limiters. Accordingly, there is a strong felt need for an etch formed load beam which will not cause fretting of low profile wires and which will not interfere with roll and pitch of the slider.

SUMMARY OF THE INVENTION

This invention provides a suspension with a low profile wired HGA having a contoured forward end portion of the load beam which reduces or eliminates fretting of the wires without limiting gimballing. This is accomplished by reducing the thickness of the forward end portion of the load beam and bending the reduced thickness forward end portion so as to present a curved front edge to the wires instead of a sharp corner. The thickness of the forward end portion is reduced from its bottom surface so that the top surface of the forward end portion is left intact. With this arrangement the forward end portion can bend downwardly without extending below the bottom surface of the load beam. Accordingly, the area below the bottom surface of the load beam is left clear so that there is no restriction to roll and pitch movements of the slider. A process for making the load beam is to mask a thin sheet of metal with top and bottom masks which configure a lateral shape of the beam, the bottom mask being shorter than the top mask and offset along the length of the beam with respect to the top mask. The sheet of metal is then etched from top and bottom simultaneously which forms the forward end portion of the load beam with a reduced thickness. A form die punch is then employed to bend the reduced thickness forward end portion of the load beam downwardly to curve the load beam's front edge.

An object of the present invention is to provide a low profile wired HGA mounted on a load beam wherein the wires can be moved across a forward end portion of the load beam without fretting and wherein a slider has unrestricted roll and pitch movements within its designed limits.

Another object is to provide an etch formed load beam which provides a curved edge adjacent low profile wires of an HGA without interfering with roll and pitch movements of a slider within designed roll and pitch limits.

A further object is to provide an improved low profile suspension which will support higher stacking density in a multi-disk drive.

Still another object is to provide a unique load beam which obviates fretting of wires which extend from a slider to processing circuitry.

Still a further object is to provide a method of making a load beam which obviates fretting of wires which extend from a slider to processing circuitry.

Other objects and attendant advantages of the invention will be readily appreciated by reading the following description taken together with the accompanying drawings.

DESCRIPTION OF THE PREFERRED EMBODIMENTS

It should be understood that the terms "top" and "bottom" are not to be construed as limiting the scope of the invention. In a multi-disk drive some suspensions are positioned adjacent top surfaces of the magnetic disks and other suspensions are positioned adjacent bottom surfaces of the magnetic disks. The terms "top" and "bottom" are intended to apply equally to both suspensions with the air bearing surface (ABS) of the slider always being the bottom of the slider as a reference.

Figure 1:
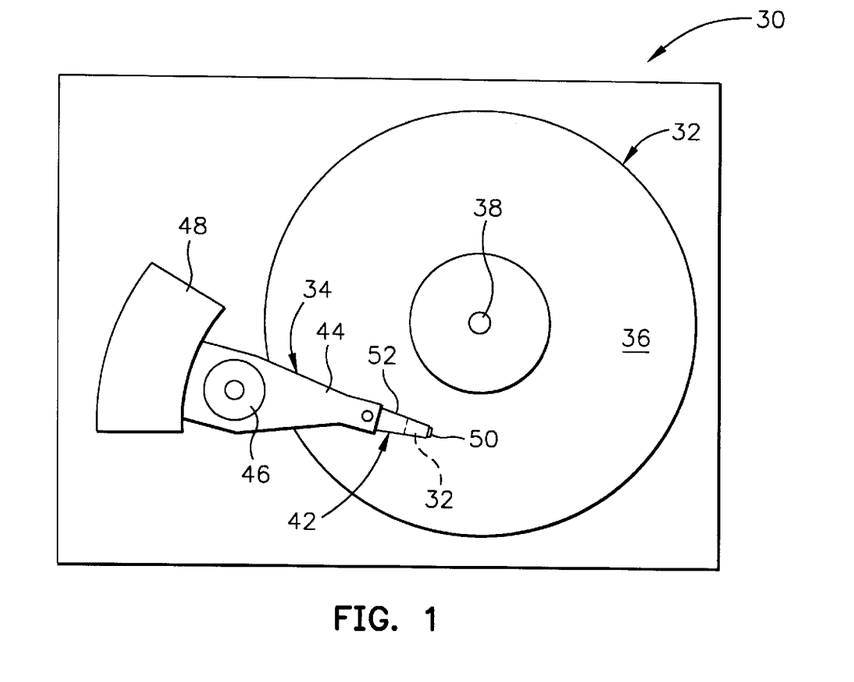
FIG. 1 is a top plan view of a magnetic disk drive.
Figure 2:
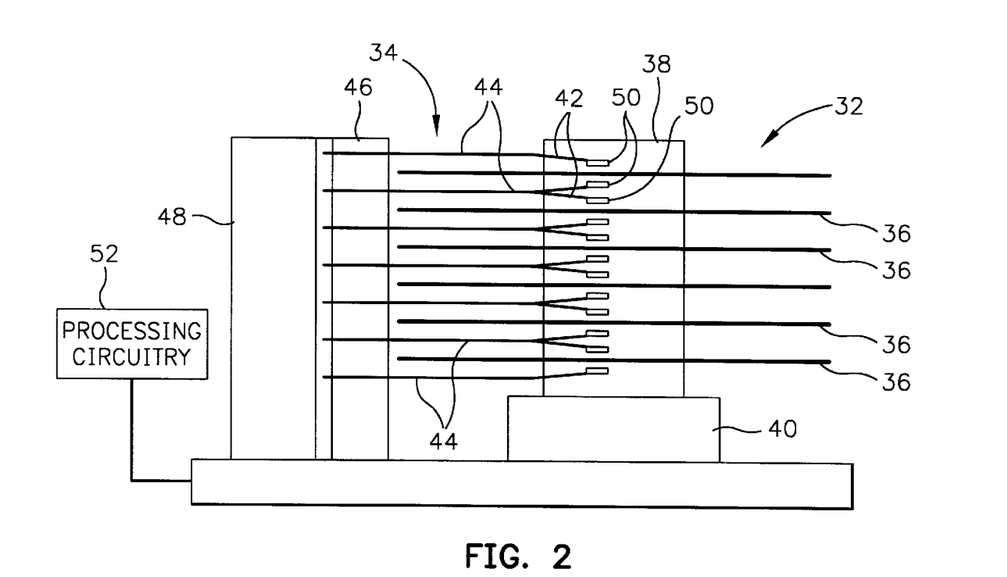
FIG. 2 is a side view of the magnetic disk drive shown in FIG. 1.

Referring now to the drawings wherein like reference numerals designate like or similar parts throughout the several views there is illustrated in FIGS. 1 and 2 a magnetic disk drive 30 which includes a disk stack assembly 32 and a head stack assembly 34. The disk stack assembly 32 includes a plurality of double-sided magnetic disks 36 which are supported for rotation by a spindle 38, the spindle 38 being rotated by a motor 40. The head stack assembly 34 includes a plurality of suspensions 42 which are connected to actuator arms 44, the actuator arms 44 being mounted for rotation on an actuator spindle 46 and being rotated by an actuator voice coil motor 48. Except for top and bottom suspensions, the suspensions are mounted in pairs to the actuator arms. The disk stacking density of the disk stack assembly 32 is partially dependent upon how closely the pairs of suspensions can be positioned upon assembly of the head stack assembly 34 into the disk stacking assembly 32. A merge comb (not shown) is employed for engaging the suspensions to squeeze them together for assembly purposes. The degree to which the suspensions can be squeezed together is dependent in part upon the profile of the wires above the suspension.

Each suspension 42 carries a slider 50 upon which there is mounted a magnetic head (not shown) for reading and writing information on circular tracks of a respective disk 36. Processing circuitry 52 is connected to the motor 40 for rotating the disk 36 and is connected to the actuator voice coil motor 48 for positioning the magnetic heads 51 at selected circular tracks on the magnetic disks 36, and is connected to the magnetic heads 51 for processing read and write signals. Each suspension 42 biases the respective magnetic head toward the surface of the disk. When a magnetic disk 36 is rotated adjacent the slider 50 air is generated by the moving disk to create an air bearing which counterbalances the preloading to cause the slider to fly a short distance from the surface of the disk, in the order of 0.075 microns (ABS to disk surface). A drive which can rotate the magnetic head 51 to any selected circular track on the surface of the disk is referred to as a direct access storage drive (DASD).

Figure 3:
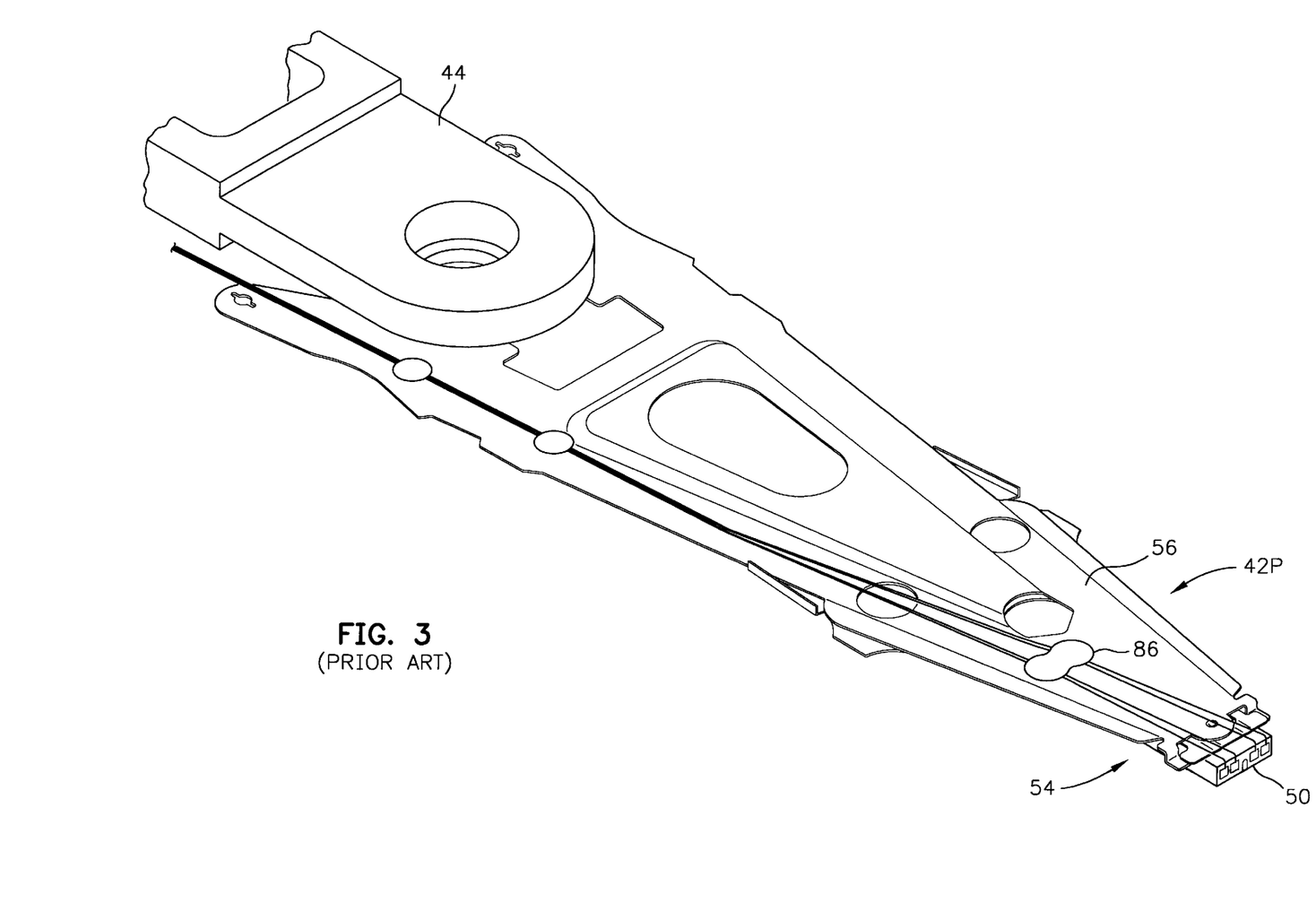
FIG. 3 is an isometric illustration of a suspension connected to an actuator arm, a rear portion of the actuator arm being broken away.
Figure 4:
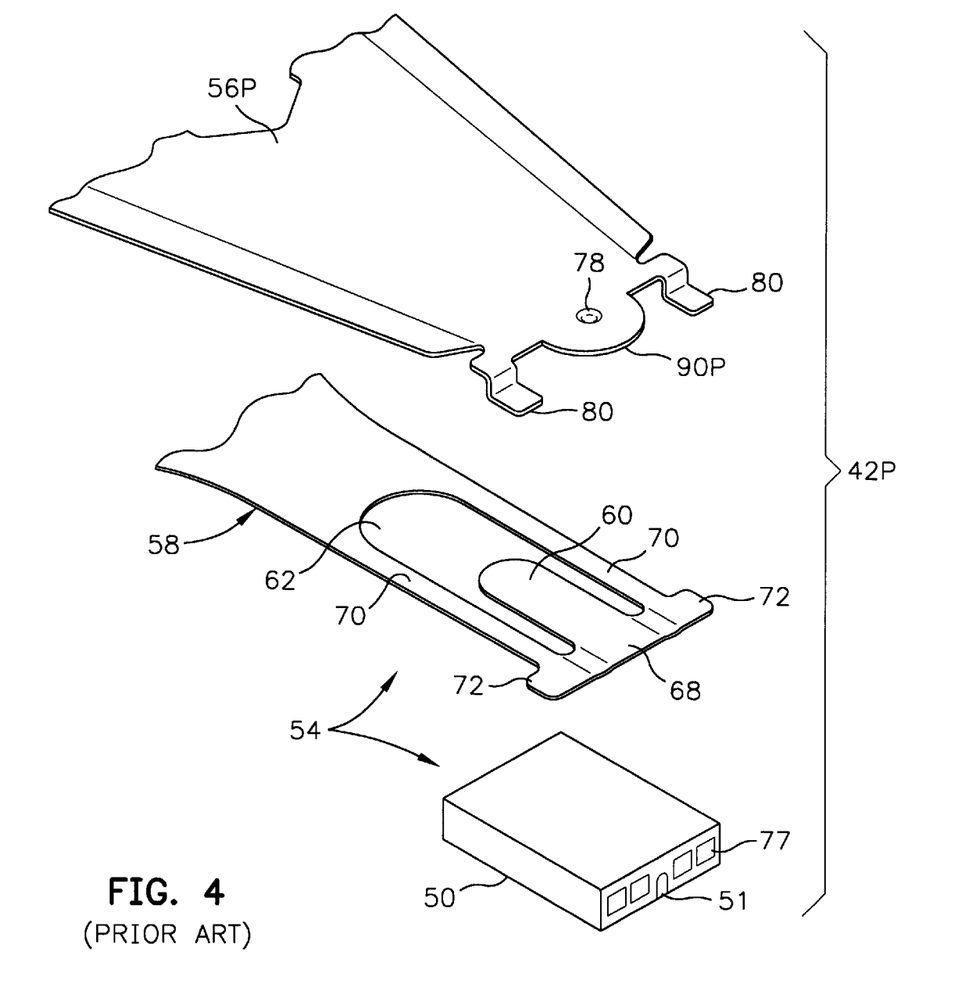
FIG. 4 is an exploded isometric prior art illustration of a portion of the load beam on top and a portion of a flexure and a slider of an HGA on the bottom.

FIG. 3 illustrates a single prior art suspension 42P connected to the bottom of an actuator arm 44. A top suspension, which may be mounted to the top of the actuator arm 44 opposite the suspension 42P, has been omitted so that details of the suspension 42P can be shown. The prior art suspension 42P includes a head gimbal assembly (HGA) 54 which is mounted to a forward end portion of a load beam 56P. As shown in FIG. 4, the HGA 54 includes the slider 50 mounted to a flexure 58. The flexure 58 is configured with a tongue 60 which is cantilevered into an opening 62. The opening 62 is partially bounded by a base 68 at a forward end of the flexure 58 and a pair of side legs 70. The slider 50 is mounted to the bottom of the tongue 60 so that it can pitch and roll in a gimballing action afforded by the flexibility of the base 68 and the side legs 70. At a forward end of the flexure 58 the base 68 is extended laterally to provide wings 72 for a purpose to be explained hereinafter. A rear end portion of the flexure 58 may be connected to a forward end portion of the load beam 56 by any suitable means such as laser welding (not shown).

Figure 6:
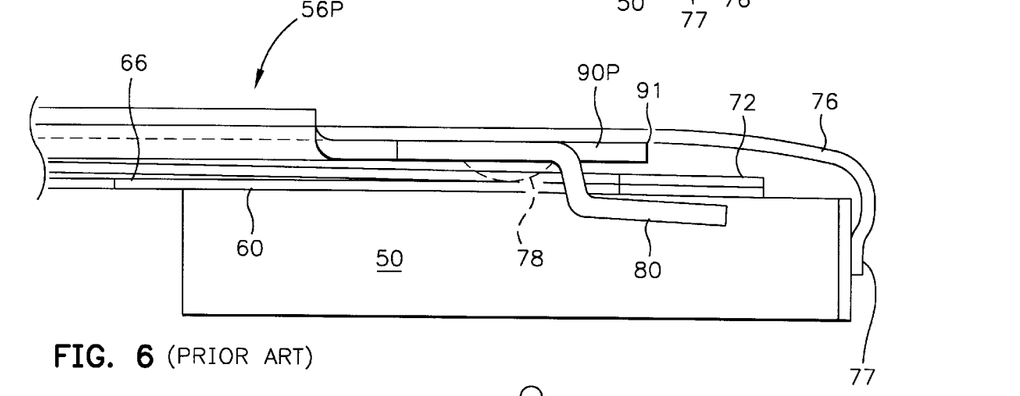
FIG. 6 is a side view of the forward portion of the prior art suspension.

As shown in FIG. 6, the forward end portion of the load beam 56P is provided with a downwardly extending load dome 78 which engages a top surface of the tongue 60 for providing a pivot point for pitch and roll of the slider 50. The forward end portion of the load beam 56P is also provided with a pair of downwardly located laterally extending tabs 80 which are positioned in a spaced relationship with respect to the wings 72 for limiting roll movements of the slider 50.

Figure 5:
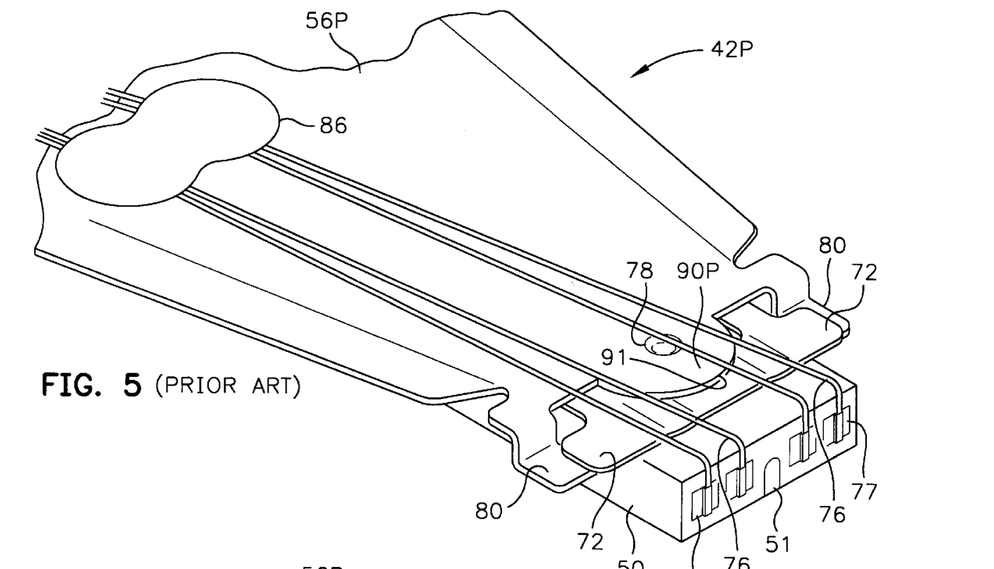
FIG. 5 is an isometric illustration of a forward portion of a prior art suspension.

As shown in FIGS. 5 and 6, wires 76 are connected to the magnetic head via pads 77 at the front of the slider. Intermediate the attachment of the wires 76 to the slider 50 at 77 and a rear end of the load beam the wires may be secured by a patch of adhesive 86 with enough slack in the wires between the adhesive and the slider to assure free movement of the slider 50 in roll and pitch. It is desirable to minimize this slack as much as possible to keep a low profile of the wires with respect to the load beam 56P so that compression of pairs of suspensions can be maximized to promote the stacking density of the disk stack assembly as discussed hereinabove. A problem with the low profile, however, is that the wires are positioned in close proximity to a forward end portion 90P of the load beam where fretting of the wires can occur. This is discussed in the next paragraph.

Figure 7:
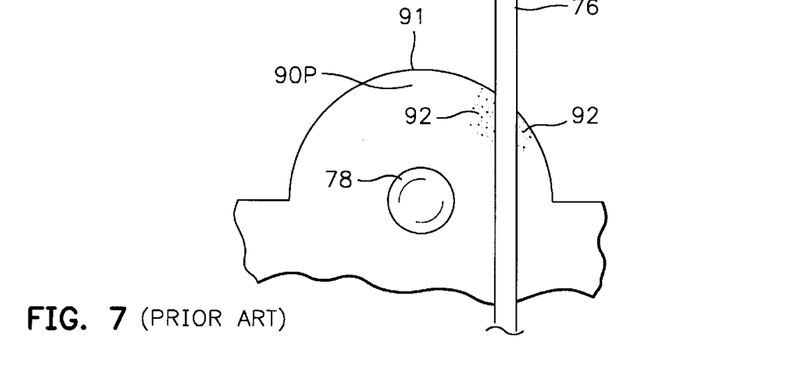
FIG. 7 is an enlarged forward portion of the prior art load beam with a wire adjacent a front sharp edge and being fretted by a corner edge of the load beam resulting in debris thereon.

In the prior art the forward end portion 90P of the load beam 56P is made by etching which results in a top front sharp corner 91 which is adjacent bottom surfaces of the wires 76. During one manufacture of the head gimbal assembly and head stack assembly, there are various shock loadings applied to the slider due to tooling and transportation which results in vertical, pitch and roll excursions of the slider. The vertical and roll excursions are limited by the roll tabs 80 on the load beam. Also, when the slider 50 flies over the surface of a disk there are additional pitching and rolling movements of the slider. With low profiled wiring there is a high potential of abrasion of the wires 76 by the sharp corner 91 causing fretting of the wires. Fretting debris can damage the disk drive due to contamination as well as possibly causing a short between the wires 76 and the load beam 56P. Fretting debris is schematically illustrated at 92 in FIG. 7 which is an enlarged forward portion 90P of the load beam with a wire 76 adjacent the sharp corner 91. There is strong-felt need to eliminate the potential of fretting debris and shorting of wires to the load beam in a low profile wired HGA wherein the load beam is constructed by etching.

Figure 11:
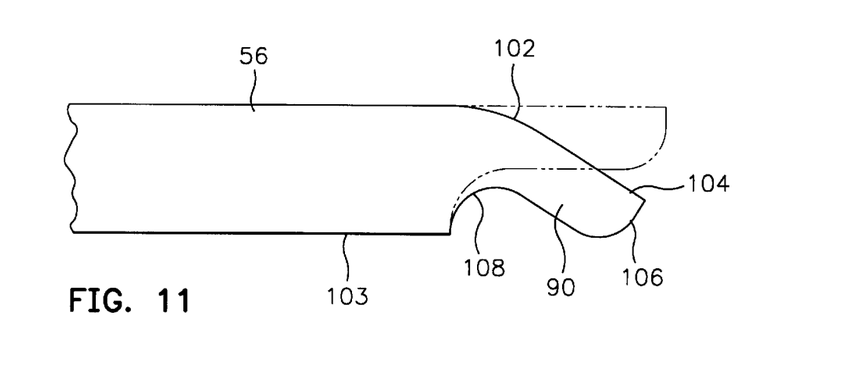
FIG. 11 is a side illustration of the forward portion of the load beam of the present invention with the original position of the forward portion before bending being shown in phantom.

The invention is embodied in suspension 42 and is illustrated in FIGS. 8–11, wherein the forward end portion 90 of the load beam 56 is uniquely configured to eliminate fretting of the wires 76 as they move there across. The load beam 56 has a substantially uniform thickness between its top and bottom surfaces and is substantially planar except for the side rails 94, the pair of tabs 80 and the forward end portion 90. The forward end portion 90 of the load beam 56 has a reduced thickness and a top curved edge 102 adjacent the wires 76. As shown in FIG. 11, the preferred thickness of the forward end portion 90 is substantially 50% of the thickness of the remainder of the load beam 56. However, the thickness of the forward end portion 90 may be in the range of 20% to 50% of the thickness of the remainder of the load beam 56. The forward end portion 90 may have a straight portion 104 which extends downwardly from the curved edge 102. In the preferred embodiment the forward end portion 90 does not extend below a bottom surface 103 of the load beam 56. With this arrangement there is no intrusion of the forward end portion 90 into space which is reserved for flexure movements of the tongue 60 and legs 70 (see FIG. 9) in response to pitch and roll movements of the slider 50. By removing a partial thickness of the load beam from the bottom of the forward end portion 90 material which would normally penetrate this space is absent. If no material is removed from the bottom of the forward end portion 90 the bending shown in FIG. 11 would drop the front end portion 90 into the space which is reserved for the aforementioned flexure movements. An etching process, which will be described in detail hereinafter, is employed for obtaining the reduced thickness forward end portion 90.

Figure 8:
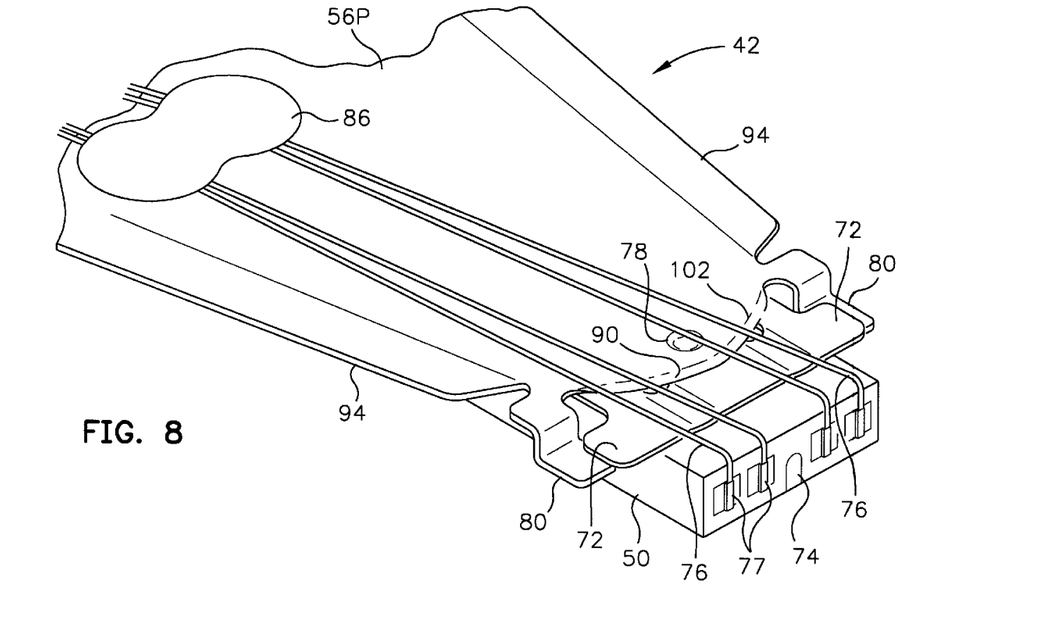
FIG. 8 is an isometric illustration of a forward portion of the present suspension.
Figure 9:
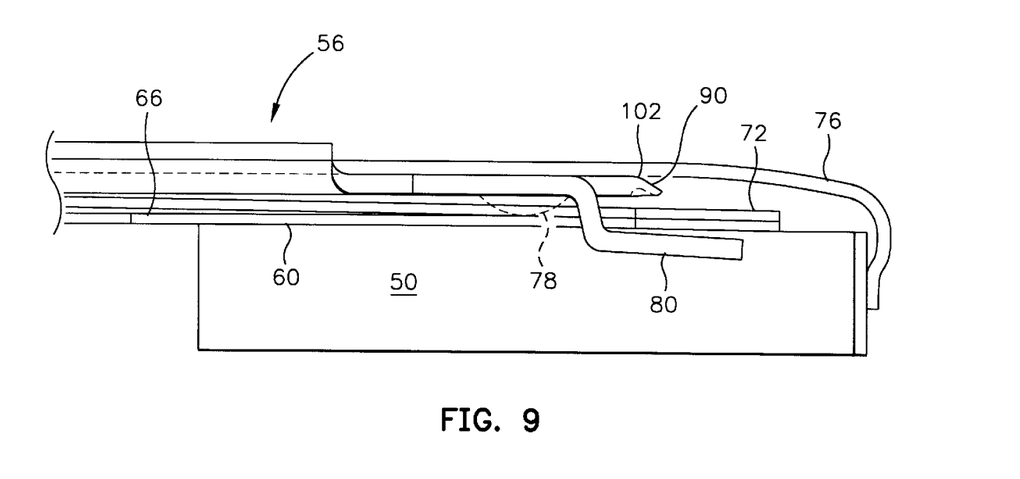
FIG. 9 is a side illustration of the forward portion of the present suspension.
Figure 10:
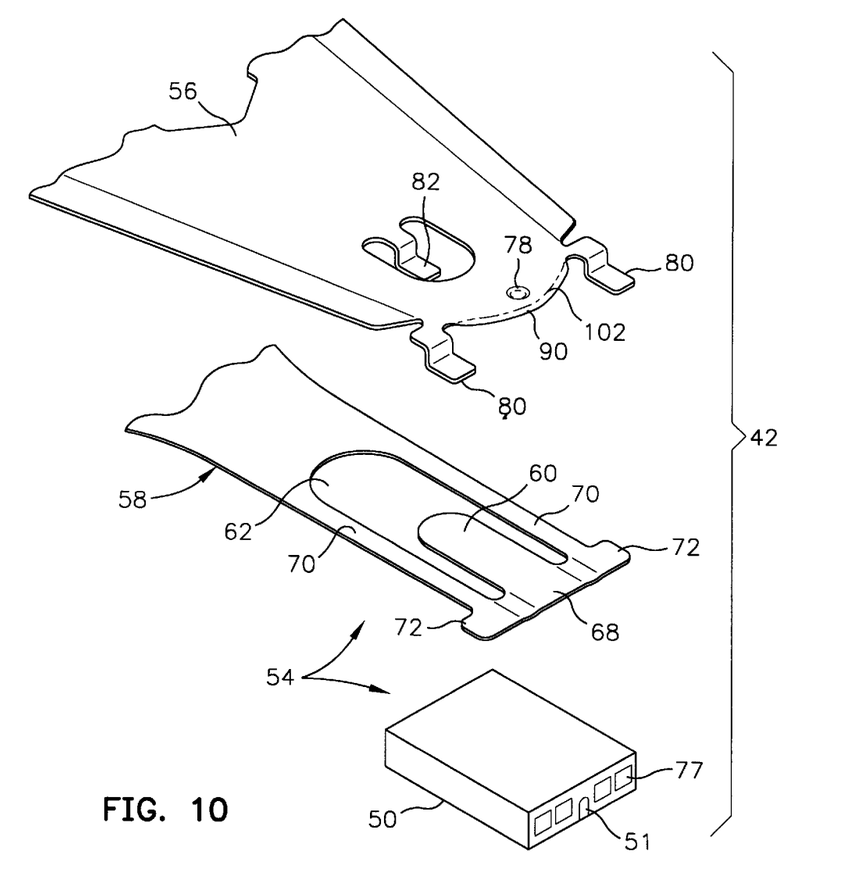
FIG. 10 is an exploded isometric illustration of a portion of the present load beam on top and a portion of a flexure and a slider of an HGA on the bottom.

The phantom lines shown in FIG. 11 denote the position of the reduced thickness forward end portion 90 prior to bending. In the phantom position the top surface of the forward end portion 90 is in the same plane with the top surface of the remainder of the load beam 56. After bending, the forward end portion 90 curves downwardly from the top surface of the load beam 56 to provide the curved edge 102. When the wires move across the curved edge 102 they are not abraded. As shown in FIG. 8 the forward end portion 90 may curve laterally from side to side which provides material for the construction of the load dome 78 and a rearward location for commencement of the tabs 80 for limiting roll of the slider 50. The etching process for making the forward end portion 90 results in a unique bottom configuration. The etching provides the forward end portion 90 with a bottom-located rounded edge 106 and a rearward-located inside rounded corner 108. The rounded corner 108 promotes a desirable bending of the forward end portion 90 which results in a smoothly curved edge 102.

Figure 12A:
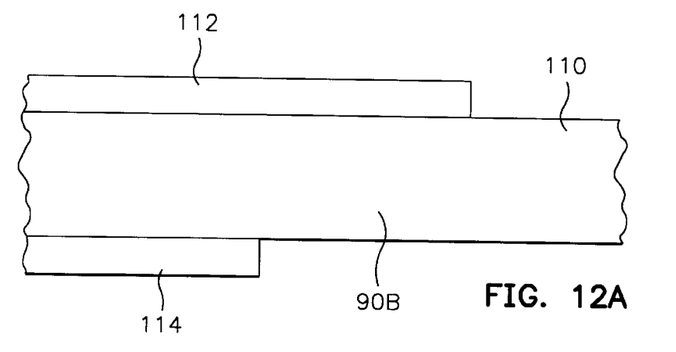
FIGS. 12A, 12B, 12C and 12D are schematic illustrations of a method of making the forward portion of the load beam of the present invention.
Figure 12B:
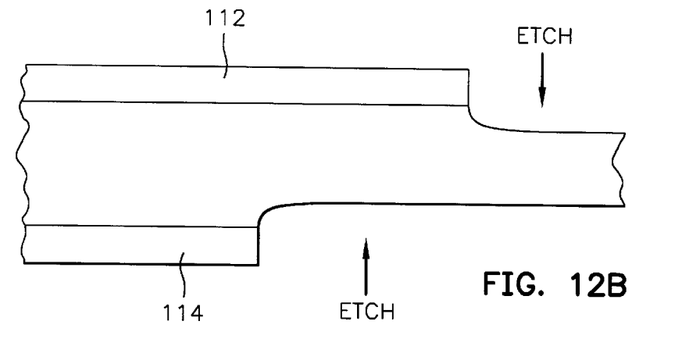
Figure 12C:
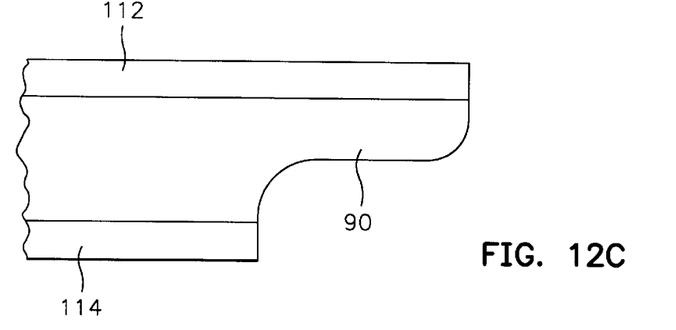
Figure 12D:
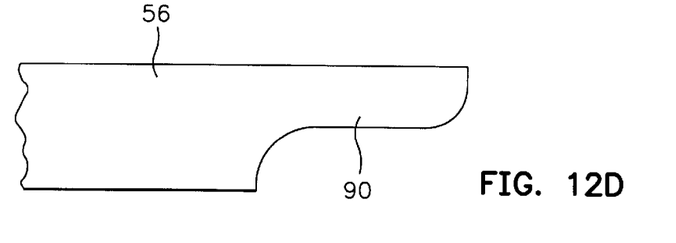

FIGS. 12A, 12B and 12C illustrate an exemplary etching method for obtaining the reduced thickness of the forward end portion 90. As shown in FIG. 12A, a sheet of stainless steel 110 is masked with top and bottom photoresist masks 112 and 114, the mask 114 being offset rearwardly from the top mask 112 a distance which defines a length of the forward end portion 90B which is to be reduced in thickness. As shown in FIG. 12B, the stainless steel sheet is subjected to an etch from both its top and its bottom which is referred to as a "double etch". This may be accomplished by simply immersing the stainless steel sheet 110 in an etchant which etches the stainless steel. FIG. 12B shows the stainless steel sheet partially etched and FIG. 12C shows the completion of the double etch. Since the etchant removes material simultaneously from both the top and bottom of the stainless steel short 110 at the same rate the thickness of the completed forward end portion 90 is substantially one-half its original thickness. FIG. 12D shows the stainless steel sheet after removal of the photoresist masks.

Figure 13:
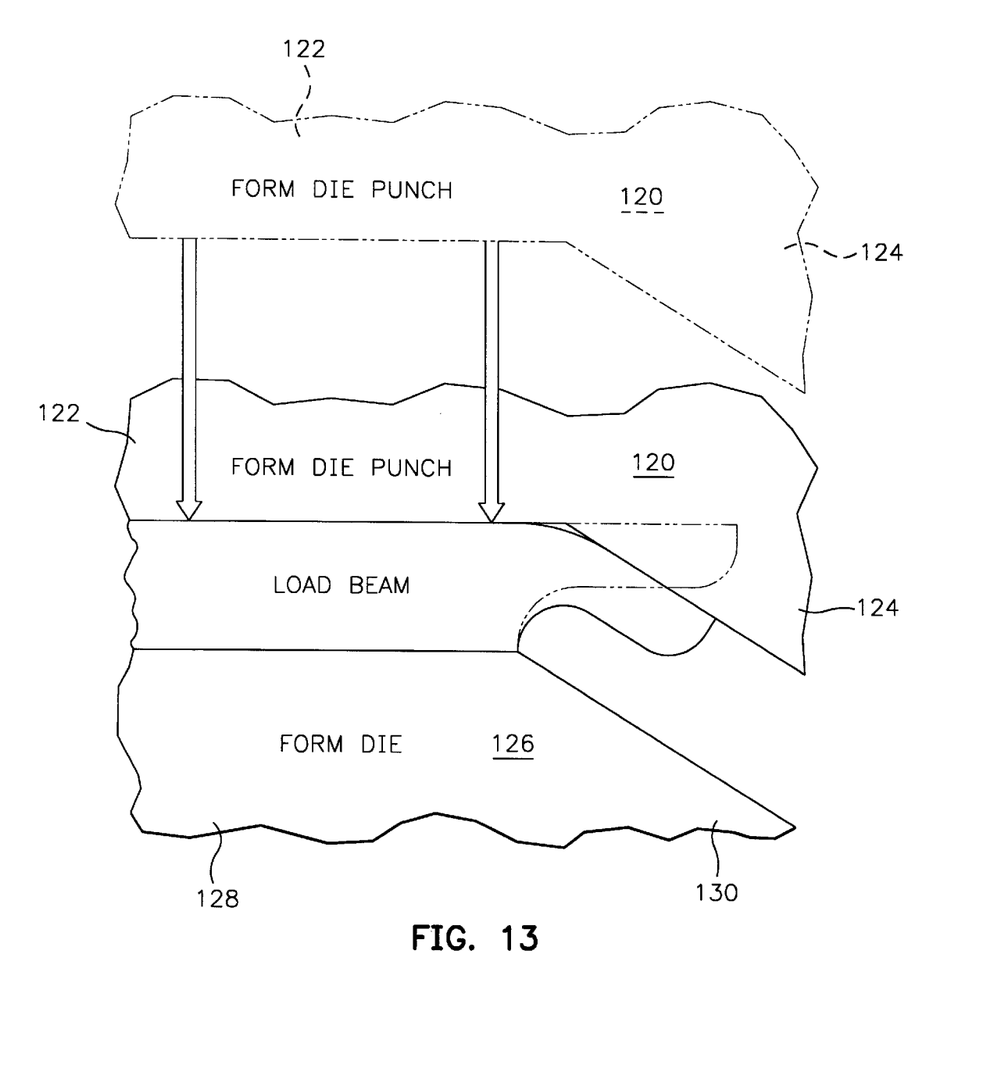
FIG. 13 is a schematic side illustration of the forward portion of the present load beam being bent by a die in order to acquire a desired rounded edge adjacent wires of the suspension.

As shown in FIG. 13, the forward end portion 90 is then subjected to bending by a form die punch 120 which has a straight portion 122 and a downwardly angled portion 124. The bottom of the load beam may be supported by a form die 126 which has a straight portion 128 and a downwardly angled portion 130 for supporting the load beam during the bending operation and also for mating with and protecting the form die punch 120 when the load beam is not present.

While the preferred embodiments of the present invention have been illustrated in detail, it should be apparent that modifications and adaptations to those embodiments may occur to one skilled in the art without departing from the scope of the present invention as set forth in the following claims.

I claim:

1. A suspension with a low profile wired head gimbal assembly comprising:

an elongated load beam having a central section which is bounded by front and rear end portions and first and second side portions the central section having top and bottom surfaces which define top and bottom planes, the rear end portion of the load beam being mountable to an actuator arm;

a head gimbal assembly including a slider and a flexure, each of the slider and the flexure having top and bottom surfaces which are bounded by front and rear ends and a pair of sides;

the top surface of the slider being mounted to the bottom surface of the flexure and the top surface of the flexure being mounted to the bottom surface portion of the load beam with the front end of the slider being located forward of the front end portion of the load beam;

the mounting of the flexure to the load beam enabling roll and pitch movements of the slider relative to the load beam;

wires connected to the slider and extending rearwardly adjacent to and over the front end portion of the load beam and thence over the top surface of the load beam;

the central section of the load beam having a thickness between said top and bottom surfaces;

said front end portion of the load beam having a forward distal end position with reduced thickness which is less than said thickness of the central section; and said front end portion having a curved portion which curves downwardly and is located entirely below said top plane, and said reduced thickness of the front end portion being provided by a notch in a bottom side of the front end portion;

so that said wires adjacent the front end portion will not be frayed should the wires engage the front end portion upon said pitch and roll movements of the slider.

2. A suspension as claimed in claim 1 including:

said front end portion being located entirely between said top and bottom planes.

3. A suspension as claimed in claim 1 including:

a bottom side of the front end portion having a forward outside curve and a rearward inside curve; and each of said curved portion, said forward outside curve and said rearward inside curve being located between said top and bottom planes.

4. A suspension as claimed in claim 3 including:

said reduced thickness being substantially uniform between said forward outside curve and said rearward inside curve.

5. A suspension as claimed in claim 1 including:

said wires being connected to said front end of the slider.

6. A suspension as claimed in claim 1 including:

the curved portion also curving laterally from side to side of the load beam.

7. A suspension as claimed in claim 1 including:

the reduced thickness of the front end portion being substantially ½ the thickness of said central section of the load beam.

8. A suspension as claimed in claim 1 including:

the front end portion having a straight portion which extends straight from the curved portion in a direction which forms a downward angle with respect to the top surface of the load beam.

9. A suspension as claimed in claim 1 including:

a bottom side of the front end portion having a forward outside curve and a rearward inside curve; and each of said curved portion, said forward outside curve and said rearward inside curve being located between said top and bottom planes.

10. A suspension as claimed in claim 9 including:

said reduced thickness being substantially uniform between said forward outside curve and said rearward inside curve.

11. A suspension as claimed in claim 10 including:

said wires being connected to said front end of the slider.

12. A suspension as claimed in claim 11 including:

the curved portion also curving laterally from side to side of the load beam.

13. A suspension as claimed in claim 12 including:

the reduced thickness of the front end portion being substantially ½ the thickness of said central section of the load beam.

14. A suspension as claimed in claim 13 including:

the front end portion having a straight portion which extends straight from the curved portion in a direction which forms a downward angle with respect to the top surface of the load beam.

15. A magnetic disk drive comprising:

an elongated load beam having a central section which is bounded by front and rear end portions and first and second side portions, the central section having top and bottom surfaces which define top and bottom planes, the rear end portion of the load beam being mountable to an actuator arm;

a head gimbal assembly including a slider and a flexure, each of the slider and the flexure having top and bottom surfaces which are bounded by front and rear ends and a pair of sides;

the top surface of the slider being mounted to the bottom surface of the flexure and the top surface of the flexure being mounted to the bottom surface portion of the load beam with the front end of the slider being located forward of the front end portion of the load beam;

the mounting of the flexure to the load beam enabling roll and pitch movements of the slider relative to the load beam;

wires connected to the slider and extending rearwardly adjacent the front end portion of the load beam and thence over the top surface of the load beam;

the central section of the load beam having a thickness between said top and bottom surfaces;

said front end portion of the load beam having a forward distal end portion with reduced thickness which is less than said thickness of the central section;

said front end portion having a curved portion which curves downwardly and is located entirely below said top plane so that said wires adjacent the front end portion will not be frayed should the wires engage the front end portion upon said pitch and roll movements of the slider said reduced thickness of the front end portion being provided by a notch in a bottom side of the front end portion;

a magnetic disk supported by a spindle and means for rotating the spindle and the magnetic disk supported thereby;

an actuator having an actuator arm, the suspension being mounted on the actuator arm so that the slider and head can be selectively positioned adjacent circular tracks on the magnetic disk; and processing circuitry connected to the actuator for positioning the slider and the head adjacent a selected circular track on the magnetic disk and connected to the head for processing write and read signals to and from the selected circular track.

16. A magnetic disk drive as claimed in claim 15 including:

a bottom side of the front end portion having a forward outside curve and a rearward inside curve; and each of said curved portion, said forward outside curve and said rearward inside curve being located between said top and bottom planes.

17. A magnetic disk drive as claimed in claim 16 including:

said reduced thickness being substantially uniform between said forward outside curve and said rearward inside curve.

18. A magnetic disk drive as claimed in claim 17 including:

the reduced thickness of the front end portion being substantially ½ the thickness of said central section of the load beam.

* * * * *

UNITED STATES PATENT AND TRADEMARK OFFICE
CERTIFICATE OF CORRECTION

PATENT NO.   : 5,815,349
DATED        : September 29, 1998
INVENTOR(S)  : Frater It is certified that error appears in the above-identified patent and that said Letters Patent is hereby corrected as shown below:

Column 8, line 34, insert a semicolon after "slider".

Signed and Sealed this

Sixteenth Day of February, 1999

Attest:

Attesting Officer

Acting Commissioner of Patents and Trademarks